(12) United States Patent
Kohata et al.

(10) Patent No.: US 9,958,127 B2
(45) Date of Patent: May 1, 2018

(54) VEHICLE LAMP

(71) Applicant: Koito Manufacturing Co., Ltd., Tokyo (JP)

(72) Inventors: Takahiro Kohata, Shizuoka (JP); Toshimasa Ikeda, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days. days.

(21) Appl. No.: 15/251,323

(22) Filed: Aug. 30, 2016

(65) Prior Publication Data

US 2017/0074479 A1    Mar. 16, 2017

(30) Foreign Application Priority Data

Sep. 10, 2015  (JP) .................................. 2015-178221

(51) Int. Cl.
  *F21S 8/10*  (2006.01)
  *B29C 65/02*  (2006.01)
(52) U.S. Cl.
  CPC .......... *F21S 48/2206* (2013.01); *B29C 65/02* (2013.01); *F21S 48/215* (2013.01)
(58) Field of Classification Search
  None
  See application file for complete search history.

(56) References Cited

U.S. PATENT DOCUMENTS

| | | | | |
|---|---|---|---|---|
| 6,464,374 B2* | 10/2002 | Akiyama | ............ | B29C 65/1635 362/267 |
| 6,592,239 B1* | 7/2003 | Akiyama | ............ | B29C 65/1638 156/272.8 |
| 2001/0028568 A1* | 10/2001 | Akiyama | ............ | B29C 66/542 362/520 |
| 2011/0203726 A1* | 8/2011 | Zaitsu | ................. | B29C 65/1635 156/272.8 |

FOREIGN PATENT DOCUMENTS

JP        2003-320593 A     11/2003

OTHER PUBLICATIONS

Benson et al., Morphology and properties of ASAJPET blends, Journal of Materials Science 31 (1996) 1425-1430.*

* cited by examiner

*Primary Examiner* — Britt D Hanley
(74) *Attorney, Agent, or Firm* — Abelman, Frayne & Schwab

(57) ABSTRACT

In a vehicle lamp of the present disclosure, a lamp body is made of an acrylonitrile styrene acrylate (ASA) resin, which has a glass transition temperature lower than that of a poly(methyl methacrylate) PMMA resin constituting a light transmissive cover. That is, with respect to the glass transition temperature Tg1 of the PMMA resin constituting the light transmissive cover, the glass transition temperature of the ASA resin constituting the lamp body is set to Tg1>Tg2. Thus, it is possible to generate not a tensile residual stress but a compressive residual stress in a welding portion (Continued)

between the lamp body and the light transmissive cover, thereby enhancing the solvent resistance of the light transmissive cover. And, thus, an annealing process after the welding is unnecessary, or simply performed.

9 Claims, 4 Drawing Sheets

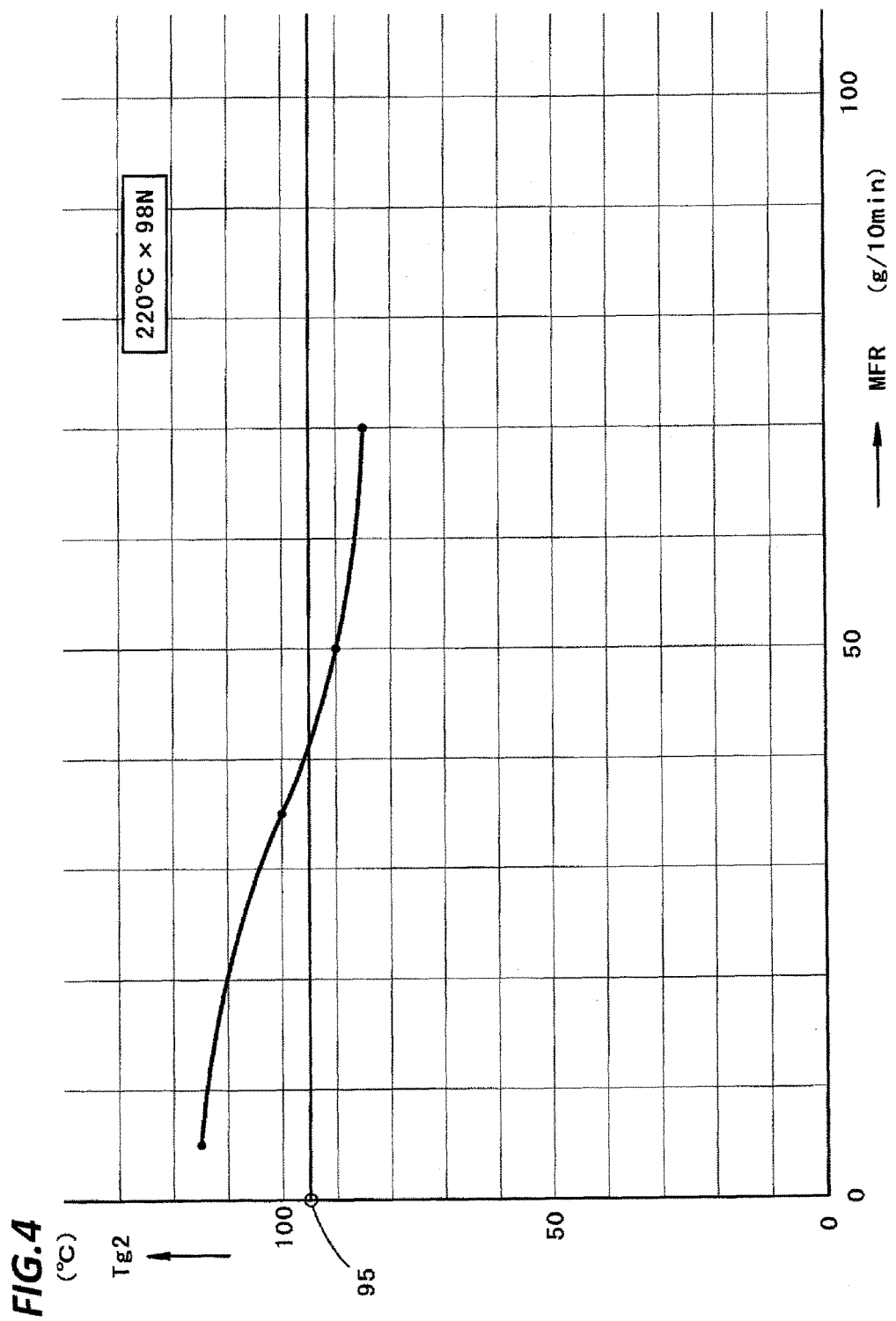

VEHICLE LAMP

CROSS-REFERENCE TO RELATED APPLICATIONS

This application is based on and claims priority from Japanese Patent Application No. 2015-178221, filed on Sep. 10, 2015 with the Japan Patent Office, the disclosure of which is incorporated herein in its entirety by reference.

TECHNICAL FIELD

The present disclosure relates to a vehicle lamp in which a light source is disposed in a lamp chamber formed by welding between a resin lamp body and a resin light transmissive cover.

BACKGROUND

In general, a vehicle lamp has a configuration in which a light source is disposed in a lamp chamber formed by a lamp body and a light transmissive cover.

As such a vehicle lamp, Japanese Patent Laid-Open Publication No. 2003-320593 discloses a configuration in which a resin lamp body and a resin light transmissive cover are welded.

SUMMARY

In the vehicle lamp in which the resin lamp body and the resin light transmissive cover are welded, a residual stress is easily generated in the welding portion thereof. At that time, when a tensile stress remains at the light transmissive cover side, cracks are generated in the light transmissive cover, for example, in a case where a solvent is applied onto the surface of the welding portion with the lamp body, resulting in water infiltration defects or appearance defects.

Therefore, conventionally, as described in Japanese Patent Laid-Open Publication No. 2003-320593, a measure has been attempted to reduce the residual stress in the welding portion in an annealing process after the lamp body and the light transmissive cover are welded.

Meanwhile, in a vehicular marker lamp such as, for example, a tail lamp, a poly(methyl methacrylate) (PMMA) resin is generally used as a material of the light transmissive cover, while an acrylonitrile butadiene styrene (ABS) resin is commonly used as a material of the lamp body. However, an acrylonitryl styrene acrylate (ASA) resin has recently been adopted because of excellent surface smoothness of a molded product as compared with the ABS resin.

However, since the ASA resin which has conventionally been used as a material of the lamp body has a glass transition temperature higher than that of the PMMA resin, a tensile residual stress is generated in the welding portion of the light transmissive cover with the lamp body. Therefore, after welding the lamp body and the light transmissive cover, a measure is required to reduce the tensile residual stress of the light transmissive cover in the annealing process.

The present disclosure has been made in consideration of the circumstance, and an object of the present disclosure is to provide a vehicle lamp including a lamp chamber formed by welding a resin lamp body and a resin light transmissive cover, and a light source disposed in the lamp chamber, in which an annealing process may be unnecessary or simplified even in a case where the light transmissive cover is made of a PMMA resin and the lamp body is made of an ASA resin.

The present disclosure facilitates the achievement of the above-described object by considering the configuration of the lamp body.

That is, the vehicle lamp according to the present disclosure includes a lamp chamber formed by welding a resin lamp body and a resin light transmissive cover, and a light source disposed in the lamp chamber. The light transmissive cover is made of a poly(methyl methacrylate) (PMMA) resin, and the lamp body is made of an acrylonitrile styrene acrylate (ASA) resin, which has a glass transition temperature lower than that of the PMMA resin constituting the light transmissive cover.

The kind of the "light source" is not particularly limited. For example, a light emitting diode or light source bulb may be employed.

As long as the "ASA resin" constituting the lamp body has a glass transition temperature lower than that of the PMMA resin constituting the light transmissive cover, its specific composition is not particularly limited.

The vehicle lamp of the present disclosure has a configuration in which the resin lamp body and the resin light transmissive cover are welded. However, since the lamp body is made of the ASA resin having a glass transition temperature lower than that of the PMMA resin, it is possible to generate not a tensile residual stress but a compressive residual stress at the light transmissive cover side. In addition, the solvent resistance of the light transmissive cover may be thus enhanced. Therefore, the annealing process after welding the lamp body and the light transmissive cover may become unnecessary or may be simplified.

According to the present disclosure, in the vehicle lamp including a lamp chamber formed by welding a resin lamp body and a resin light transmissive cover, and a light source disposed in the lamp chamber, an annealing process may be unnecessary or simplified merely by the configuration in which the light transmissive cover is made of the PMMA resin and the lamp body is made of the ASA resin.

Hence, a large and costly facility for the annealing process as in the related art may be eliminated or reduced, and the productivity may be enhanced by reducing the lead time.

In the configuration, when an ASA resin having a melt mass flow rate (MFR), which indicates a flow characteristic, of 50 (g/10 min) or more under a test condition of 220° C.×98 N is used as the ASA resin constituting the lamp body, the glass transition temperature of the ASA resin constituting the lamp body is easily set to a value lower than the glass transition temperature of the PMMA resin constituting the light transmissive cover. Furthermore, when such an ASA resin having a high flow characteristic is used, the moldability of the lamp body may be enhanced.

In the configuration, when a direct vapor deposition is performed on an inner surface of the lamp body, the following acting effects may be obtained.

That is, since the lamp body is made of the ASA resin as described above, the surface smoothness may be enhanced as compared with a case where the lamp body is made of an ABS resin. Thus, when a vapor deposition is performed on the inner surface of the lamp body, it is possible to perform a direct vapor deposition without applying an undercoat as a conventional pre-processing. Therefore, since a direct vapor deposition is performed on the inner surface of the lamp body, the lamp manufacturing process may be simplified, and the manufacturing cost may be reduced.

In the configuration, when a light emitting device (e.g., a light emitting diode) is used as the light source, the following acting effects may be obtained.

That is, when a light emitting device is used as the light source, radiant heat from the light source may be considerably reduced, as compared with a case of, for example, a light source bulb. Thus, the lamp body may be suppressed from being increased in temperature in advance. Therefore, when the glass transition temperature of the ASA resin constituting the lamp body is set to a value lower than the glass transition temperature of the PMMA resin constituting the light transmissive cover, it is unnecessary to consider any influence of the radiant heat from the light source.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 4 is a graph for explaining the action of the exemplary embodiment.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, an exemplary embodiment of the present disclosure will be described with reference to the drawings.

Figure 1:
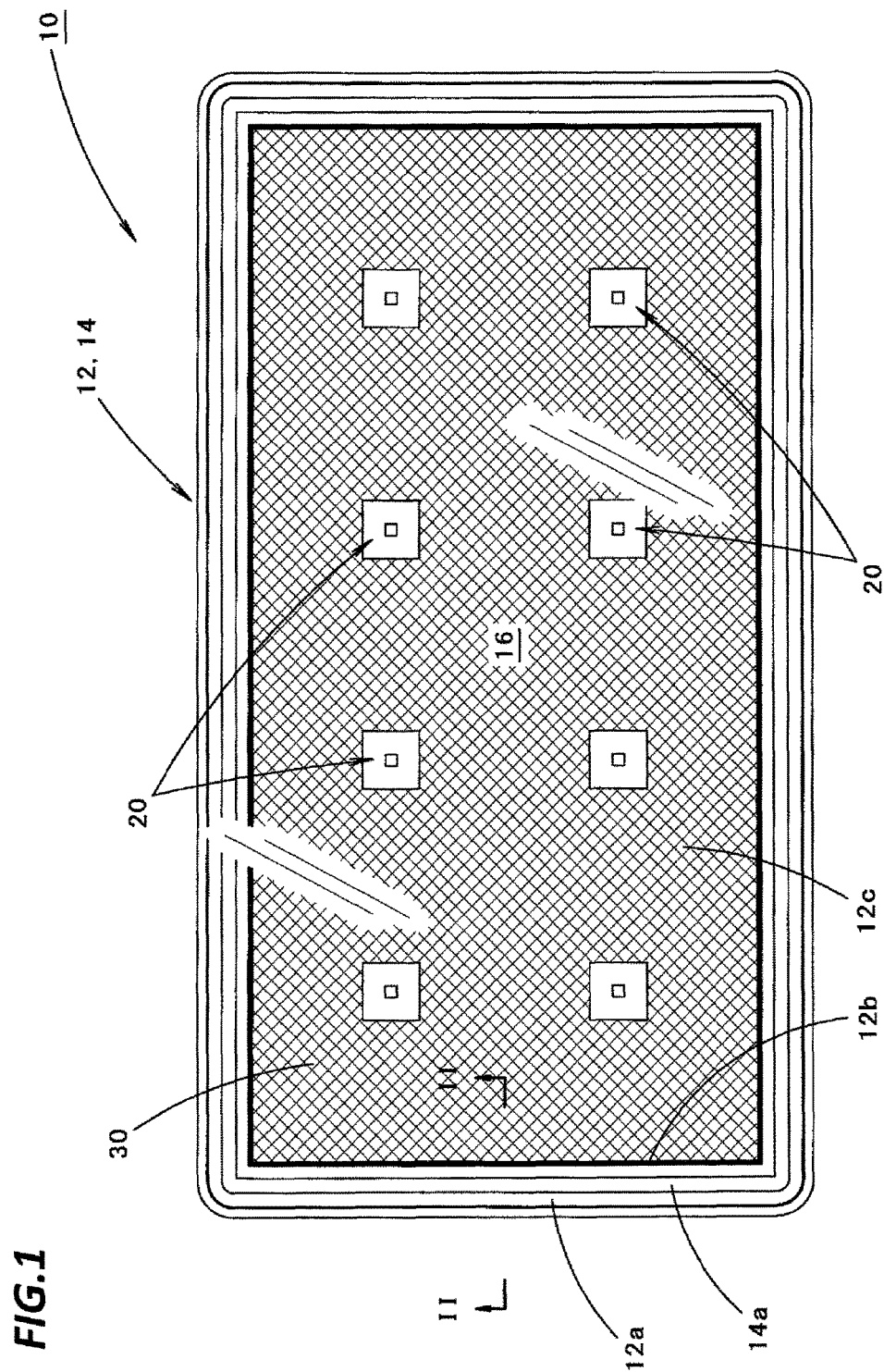
FIG. 1 is a front view of a vehicle lamp according to an exemplary embodiment of the present disclosure.
Figure 2:
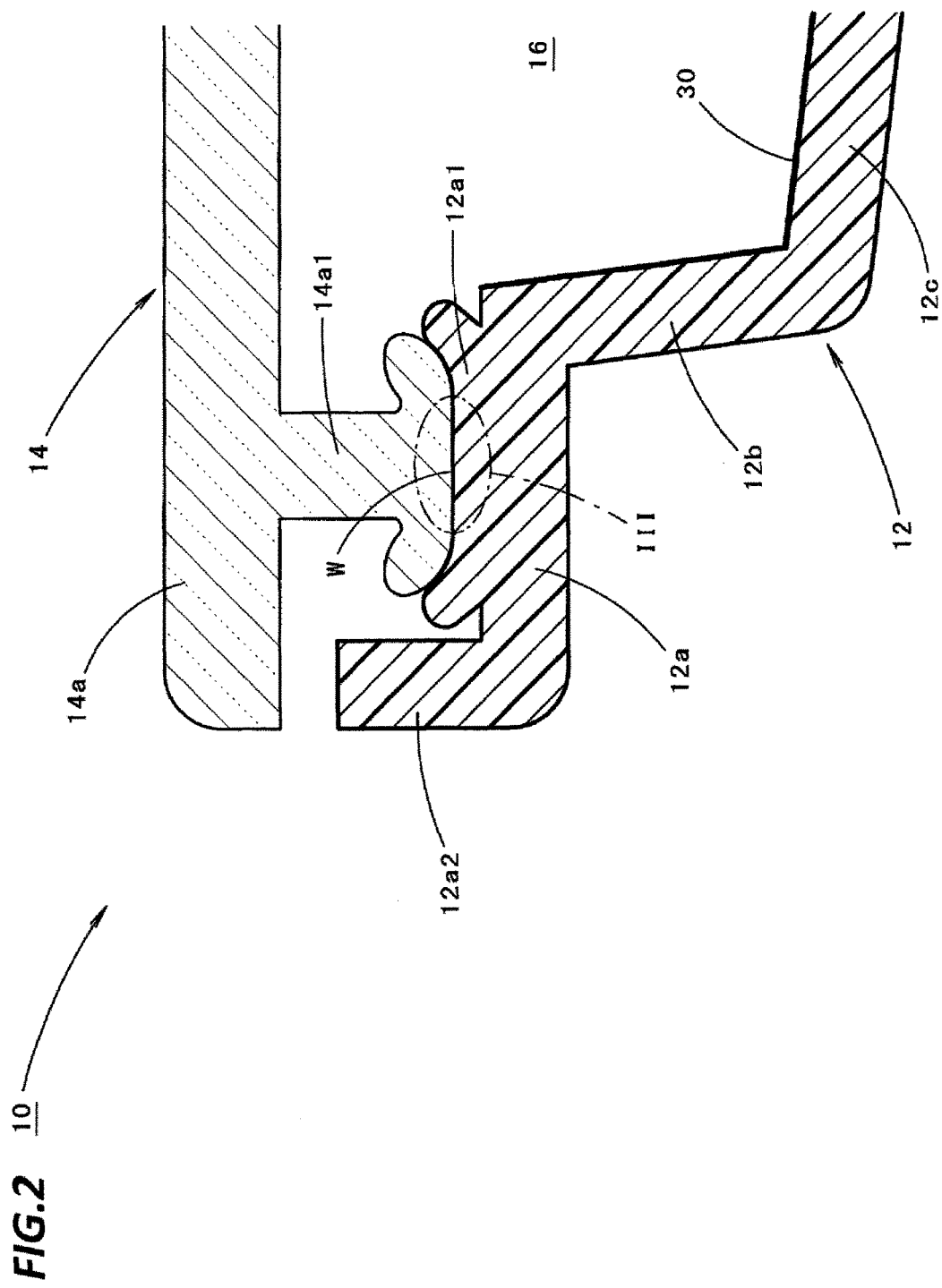
FIG. 2 is a detailed view of the cross-section along line II-II of FIG. 1.

FIG. 1 is a front view illustrating a vehicle lamp 10 according to an exemplary embodiment of the present disclosure. In addition, FIG. 2 is a detailed view of the cross-section along line II-II of FIG. 1.

As illustrated in the drawings, the vehicle lamp 10 according to the present exemplary embodiment is a tail lamp provided at the rear side of the vehicle, and is configured such that a plurality of light sources 20 are accommodated within a lamp chamber 16 formed by a lamp body 12 and a light transmissive cover 14.

Each light source 20 is a light emitting device, and is disposed such that the light emitting surface is directed toward the front side of the lamp (the rear side of the vehicle). Specifically, each light emitting device is a red light emitting diode, and is supported by the lamp body 12 through a substrate (not illustrated).

Both of the lamp body 12 and the light transmissive cover 14 are made of a resin, and fixed by a welding at their outer peripheral edge portions 12a, 14a.

The lamp body 12 is made of an acrylonitrile styrene acrylate (ASA) resin, and the light transmissive cover 14 is made of a poly(methyl methacrylate) (PMMA) resin.

The ASA resin constituting the lamp body 12 is set to have a glass transition temperature lower than that of the PMMA resin constituting the light transmissive cover 14. Specifically, the glass transition temperature of the PMMA resin constituting the light transmissive cover 14 is about 95° C., whereas the glass transition temperature of the ASA resin constituting the lamp body 12 is set to a value of about 85° C. to 90° C.

In order to securely realize this configuration, as the ASA resin constituting the lamp body 12, an ASA resin having a melt mass flow rate (MFR), which indicates a flow characteristic, of 50 (g/10 min) or more under a test condition of 220° C.×98 N is used.

As illustrated in FIG. 2, the outer peripheral edge portion 12a of the lamp body 12 extends substantially in parallel with the outer peripheral edge portion 14a of the light transmissive cover 14. A pedestal portion 12a1 for the welding is formed on the front surface thereof, and a flange portion 12a2 extending forward is formed on the outermost peripheral edge portion thereof. Meanwhile, the light transmissive cover 14 is formed in a plain form, and a rib 14a1 extending rearward is formed on the rear surface of the outer peripheral edge portion 14a to face the pedestal portion 12a1 of the lamp body 12.

In the present exemplary embodiment, the welding of the lamp body 12 and the transparent cover 14 is formed by a hot plate welding.

That is, the lamp body 12 and the light transmissive cover 14 are welded by melting the front surface of the pedestal portion 12a1 of the lamp body 12 and the rear surface of the rib 14a1 of the light transmissive cover 14 by a hot plate (not illustrated), and then, pressing both in the longitudinal direction of the lamp. A welding surface W of the pedestal portion 12a1 of the lamp body 12 and the rib 14a1 of the light transmissive cover 14 extends in a substantially planar shape along the plane orthogonal to the longitudinal direction of the lamp, but both side portions are curved to the front side by occurrence of molten burrs.

A peripheral wall portion 12b extending substantially in the longitudinal direction of the lamp is formed at the inner peripheral side of the outer peripheral edge portion 12a in the lamp body 12, and a rear wall portion 12c is formed at the inner peripheral side of the peripheral wall portion 12b. And, a vapor deposition film 30 is formed on the inner surfaces of the peripheral wall portion 12b and the rear wall portion 12c in the lamp body 12 by a metal vapor deposition such as, for example, an aluminum vapor deposition. The metal vapor deposition is performed by a direct vapor deposition without applying an undercoat as a pre-processing.

Figure 3:
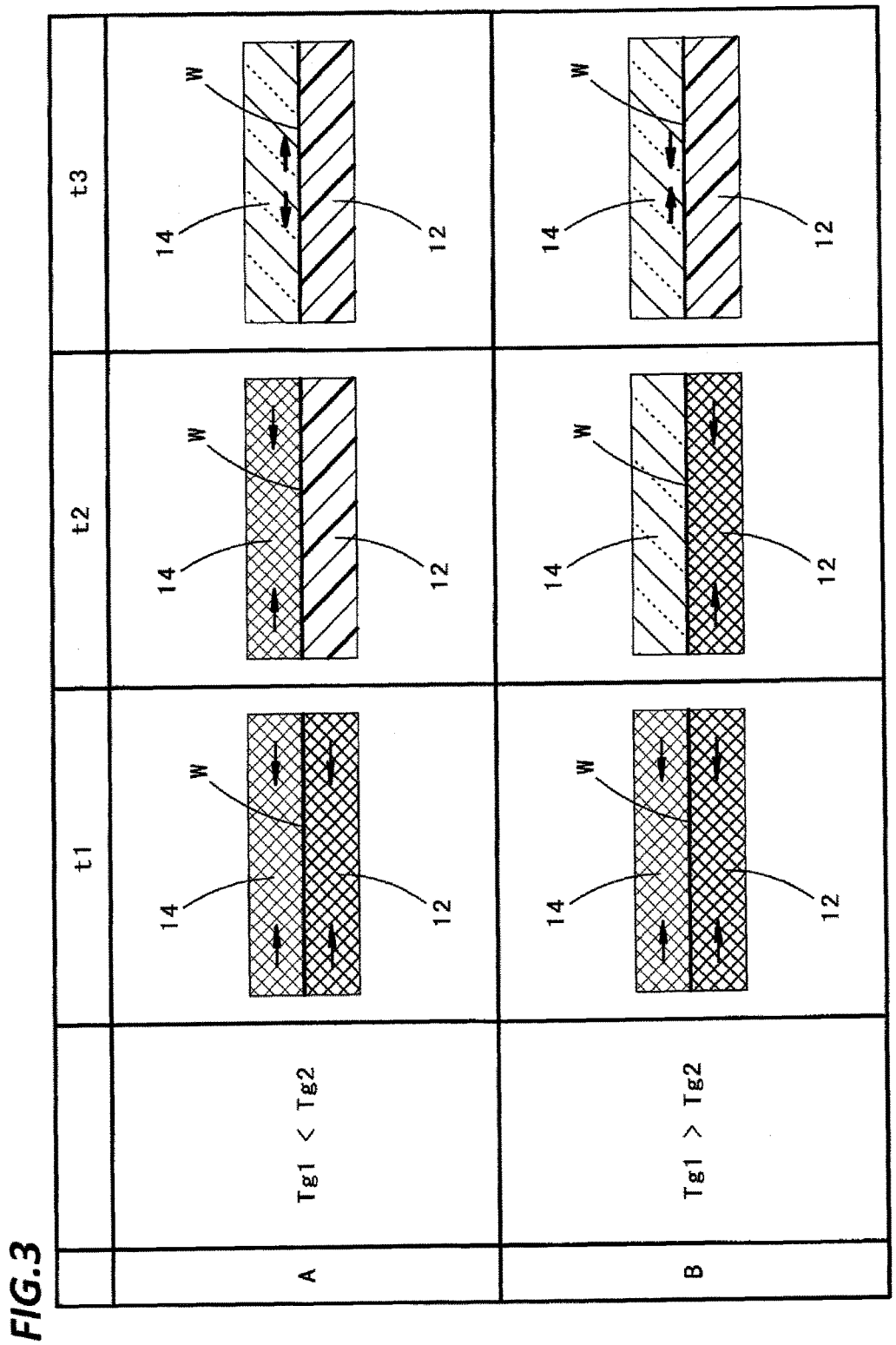
FIG. 3 is a view illustrating an action of the exemplary embodiment in comparison with a conventional embodiment, using a detailed view of portion III of FIG. 2.

FIG. 3 is a view illustrating an action of the exemplary embodiment in comparison with a conventional embodiment, using a detailed view of portion III of FIG. 2.

FIG. 3 is a view illustrating, as a table, a state of stress generated in the welding portion when the lamp body 12 and the light transmissive cover 14 are welded.

In the table, t1 to t3 of the top columns in respective rows represent a lapse of time after the welding. t1 represents a timing immediately after the welding. t2 represents a timing after a predetermined time elapses from t1. t3 represents a timing after a further predetermined time elapses from t2.

Further, assuming that the glass transition temperature of the PMMA resin constituting the light transmissive cover 14 is Tg1, and the glass transition temperature of the ASA resin constituting the lamp body 12 is Tg2, left columns A, B in respective lines of the table represent a relationship of Tg1 and Tg2. Column A shows a case of Tg1<Tg2, and column B shows a case of Tg1>Tg2.

First, column A in the table will be described.

As in the related art, in the case of Tg1<Tg2, the molten lamp body 12 and light transmissive cover 14 are cooled and shrink together at the timing of t1 immediately after the welding, but their shrinkage directions are the same at both side of the welding surface W.

At the timing of t2 when the cooling in the welding portion has progressed to some extent, the lamp body 12 is solidified as the temperature of the ASA resin constituting the lamp body 12 becomes equal to or less than the glass transition temperature Tg2, but the light transmissive cover 14 remains in the molten state and continues to shrink.

And, at the timing of t3 when the cooling in the welding portion has further progressed, the light transmissive cover 14 is also solidified as the temperature of the PMMA resin constituting the light transmissive cover 14 becomes equal to or less than the glass transition temperature Tg1. At that time, due to the continuous shrinkage of the light transmissive cover 14 until the light transmissive cover 14 is solidified after the lamp body 12 is solidified, a tensile residual stress is generated in the light transmissive cover 14.

Next, column B in the table will be described.

As in the present exemplary embodiment, in the case of Tg1>Tg2, the molten lamp body 12 and light transmissive cover 14 are cooled and shrink together at the timing of t1 immediately after the welding, but their shrinkage directions are the same at both side of the welding surface W.

At the timing of t2 when the cooling in the welding portion has progressed to some extent, the light transmissive cover 14 is solidified as the temperature of the PMMA resin constituting the light transmissive cover 14 becomes equal to or less than the glass transition temperature Tg1, but the lamp body 12 remains in the molten state and continues to shrink.

And, at the timing of t3 when the cooling in the welding portion has further progressed, the lamp body 12 is also solidified as the temperature of the ASA resin constituting the lamp body 12 becomes equal to or less than the glass transition temperature Tg2. At that time, due to the continuous shrinkage of the lamp body 12 until the lamp body 12 is solidified after the light transmissive cover 14 is solidified, a compressive residual stress is generated in the light transmissive cover 14.

FIG. 4 is a graph for explaining the action of the present exemplary embodiment.

The graph illustrates a result of measuring the relationship between the melt mass flow rate (MFR) and the glass transition temperature Tg2 of the ASA resin under a test condition of 220° C.×98 N.

As illustrated in FIG. 4, Tg2 of the ASA resin tends to decrease as MFR increases. Thus, near a point where MFR exceeds 40 (g/10 min), Tg2 becomes 95° C. or less, and when MFR exceeds 50 (g/10 min), Tg2 is further reduced to 90° C. or less.

Next, acting effects of the present exemplary embodiment will be described.

The vehicle lamp 10 of the present exemplary embodiment has a configuration in which the resin lamp body 12 and the resin light transmissive cover 14 are welded. However, since the lamp body 12 is made of the ASA resin having a glass transition temperature lower than that of the PMMA constituting the light transmissive cover 14 (i.e., since the glass transition temperature Tg2 of the ASA resin constituting the lamp body 12 with respect to the glass transition temperature Tg1 of the PMMA resin constituting the light transmissive cover 14 is set to Tg1>Tg2), as illustrated in FIG. 3, it is possible to generate not a tensile residual stress but a compressive residual stress at the light transmissive cover 14 side in the welding portion of the lamp body 12 and the light transmissive cover 14. In addition, the solvent resistance of the light transmissive cover 14 may be thus enhanced. Therefore, the annealing process after welding the lamp body 12 and the light transmissive cover 14 may become unnecessary or may be simplified.

According to the present exemplary embodiment, in the vehicle lamp 10 including the lamp chamber 16 formed by welding the resin lamp body 12 and the resin light transmissive cover 14, and a light source 20 disposed in the lamp chamber 16, an annealing process may be unnecessary or simplified even in a case where the light transmissive cover 14 is made of the PMMA resin and the lamp body 12 is made of the ASA resin.

Hence, a large and costly facility for the anneal process as in the related art may be eliminated or reduced, and the productivity may be enhanced by reducing the lead time.

In the present exemplary embodiment, since an ASA resin having a melt mass flow rate (MFR), which indicates a flow characteristic, of 50 (g/10 min) or more under a test condition of 220° C.×98 N is used as the ASA resin constituting the lamp body 12, the glass transition temperature Tg2 of the ASA resin constituting the lamp body 12 is easily set to a value lower than about 95° C., which is the glass transition temperature Tg1 of the PMMA resin constituting the light transmissive cover 14, as illustrated in FIG. 4. Furthermore, when such an ASA resin having a high flow characteristic is used, the moldability of the lamp body 12 may be enhanced.

Further, in the present exemplary embodiment, since a direct vapor deposition is performed on an inner surface of the lamp body 12, the following acting effects may be obtained.

That is, since the lamp body 12 is made of the ASA resin, the surface smoothness may be enhanced as compared with a case where the lamp body 12 is made of an ABS resin. Thus, when a vapor deposition is performed on the inner surface of the lamp body 12 to form the vapor deposition film 30, it is possible to perform a direct vapor deposition without applying an undercoat as a conventional pre-processing. Therefore, since a direct vapor deposition is performed on the inner surface of the lamp body 12, the lamp manufacturing process may be simplified, and the manufacturing cost may be reduced.

Further, in the present exemplary embodiment, since a light emitting device is adopted as the light source 20, the following acting effects may be obtained.

That is, when a light emitting device is used as the light source 20, radiant heat from the light source 20 may be considerably reduced, as compared with a case of, for example, a light source bulb. Thus, the lamp body 12 may be suppressed from being increased in temperature in advance. Therefore, when the glass transition temperature Tg2 of the ASA resin constituting the lamp body 12 is set to a value lower than the glass transition temperature Tg1 of the PMMA resin constituting the light transmissive cover 14, it is unnecessary to consider any influence of the radiant heat from the light source 20.

In the exemplary embodiment, descriptions were made on the case where the welding of the lamp body 12 and the light transmissive cover 14 is performed by a hot plate welding. However, the welding may also be performed by other welding methods (e.g., vibration welding or laser welding).

In the exemplary embodiment, descriptions were made on the case where the light transmissive cover 14 is formed in a plain form. However, a lens device may be formed inside the light transmissive cover 14.

In the exemplary embodiment, descriptions were made on the case where the vehicle lamp 10 is a tail lamp. However, besides the tail lamp, even in a case of a stop lamp, a turn signal lamp, a clearance lamp, or a daytime running lamp, the same acting effects as in the exemplary embodiment may be obtained by adopting the same configuration as in the exemplary embodiment, regardless of the location or function provided in the vehicle.

Further, in the exemplary embodiment, the numeric values shown as specifications in the above exemplary embodiment are merely illustrative, and different values may be, of course, set as appropriate.

Further, the present disclosure is not limited to the configuration described in the exemplary embodiment, and various modified configurations may be adopted.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicle lamp comprising:
   a lamp chamber formed by welding a resin lamp body and a resin light transmissive cover; and
   a light source disposed in the lamp chamber,
   wherein the light transmissive cover is made of a poly (methyl methacrylate) (PMMA) resin,
   the lamp body is made of an acrylonitrile styrene acrylate (ASA) resin, and
   a glass transition temperature of the ASA resin is set to a value lower than that of the PMMA resin constituting the light transmissive cover such that a compressive residual stress is generated at a side of the light transmissive cover in a welding portion of the lamp body and the light transmissive cover.

2. The vehicle lamp of claim 1, wherein the ASA resin is an ASA resin having a melt mass flow rate (MFR), which indicates a flow characteristic, of 50 (g/10 min) or more under a test condition of 220° C.×98 N.

3. The vehicle lamp of claim 1, wherein a direct vapor deposition is performed on an inner surface of the lamp body.

4. The vehicle lamp of claim 2, wherein a direct vapor deposition is performed on an inner surface of the lamp body.

5. The vehicle lamp of claim 1, wherein the light source is a light emitting device.

6. The vehicle lamp of claim 2, wherein the light source is a light emitting device.

7. The vehicle lamp of claim 3, wherein the light source is a light emitting device.

8. The vehicle lamp of claim 4, wherein the light source is a light emitting device.

9. The vehicle lamp of claim 1, wherein the glass transition temperature of the the PMMA resin constituting the light transmissive cover is about 95° C., and the glass transition temperature of the ASA resin of the lamp body is about 85° C. to 90° C.

* * * * *